United States Patent [19]
Crossman

[11] 3,744,597
[45] July 10, 1973

[54] TURBO-BRAKE HAVING GEAR RATIO CHANGER

[75] Inventor: Richard L. Crossman, Tallmadge, Ohio

[73] Assignee: The Goodyear Tire & Rubber Company, Akron, Ohio

[22] Filed: July 28, 1971

[21] Appl. No.: 166,950

Related U.S. Application Data

[63] Continuation-in-part of Ser. No. 849,994, Aug. 14, 1969, abandoned.

[52] U.S. Cl. ............... 188/291, 74/290, 188/292, 192/61
[51] Int. Cl. ............................................ F16d 57/00
[58] Field of Search ............... 188/290, 292, 291; 74/790, 791; 192/61

[56] References Cited
UNITED STATES PATENTS

| | | |
|---|---|---|
| 2,390,626 | 12/1945 | Szekely .......................... 74/782 X |
| 2,786,553 | 3/1957 | Boone et al ..................... 188/292 |
| 3,182,759 | 5/1965 | Kelemen ........................ 188/290 X |

*Primary Examiner*—George E. A. Halvosa
*Attorney*—Albert H. Oldham et al.

[57] ABSTRACT

A drive system for an output member such as a turbo-brake member including an impeller driven by a planetary gear assembly is provided.

A gear ratio changer means including gear pumps is received in a chamber in a case or housing means, and connects to the planetary gear assembly to control the drive gear ratio of the same, and means are associated with said gear ratio changer means for connection to a pressure system to receive pressure therefrom to restrict hydraulic flow in the gear pumps and control the output of said gear ratio changer means.

12 Claims, 5 Drawing Figures

INVENTOR.
RICHARD L. CROSSMAN
BY
Oldham & Oldham
ATTORNEYS.

INVENTOR.
RICHARD L. CROSSMAN
BY
Oldham & Oldham
ATTORNEYS.

TURBO-BRAKE HAVING GEAR RATIO CHANGER

This is a continuation-in-part of patent application Ser. No. 849,994, filed Aug. 14, 1969 and which is now abandoned.

The present invention, generally speaking, relates to turbo-brakes, and particularly to an improved vari-speed driving assembly for the impeller of a turbo-brake whereby a wide variation in input drive speeds can be provided to control corresponding variations in the output drive of the impeller.

BACKGROUND OF THE INVENTION

Heretofore there have been a number of patents issued on turbo-brakes, and one of such patents is Kelemen U.S. Pat. No. 3,142,361. Such patent shows an impeller positioned at the axial outer end of a wheel positioning spindle and wherein such impeller is adapted to draw air axially inwardly of the wheel and force it radially outwardly while doing work thereon in order to produce a braking action on the wheel by a large volume of air being processed very rapidly. Means are provided, including a planetary gear system, for driving the impeller at a high rate of speed in relation to the wheel rotational rate while clutch means control the action of the planetary gear system to vary the relative rotational speed of the impeller in relation to the wheel.

SUBJECT MATTER OF THE INVENTION

From a broad novelty viewpoint, the present invention relates to an improvement in turbo-brakes, and particularly to the driving system for a turbo-brake wherein planetary gear means are provided for driving the impeller at a high rate of speed, and a closed system gear ratio changer means is provided in association with the planetary gear carrier plate forming the gear ratio of the control planetary gear system and wherein a pressure disc is provided in association with a portion of the gear changer comprising a gear pump whereby clearances in the gear pump or the gear ratio changer system can be varied and wherein the gear ratio changer forms the control for a carrier plate in a planetary gear system and the relative rotational speed of such carrier plate in relation to the axle can be varied to control the drive of the impeller.

The general object of the present invention is to provide an improved non-frictional type vari-speed transmission especially suitable for driving planetary gear means in a turbo-brake drive system for controlling the speed of the impeller of the turbo-brake.

A further object of the invention is to provide an improved speed changer drive means for the impeller of a turbo-brake wherein vehicle brake system pressures can be used for adjustably controlling the clearances in a gear ratio changer forming a part of the control means for a planetary gear system for a turbo-brake.

Another object of the invention is to provide a relatively uncomplicated, positive acting, gear ratio changer means in a drive of an article, such as a turbo-brake, and to use a closed system gear pump in the gear ratio changer means.

Another object of the invention is to provide a relatively inexpensive, easily assembled, relatively maintenance free, gear ratio changer means including a sun gear and pinion gear forming a gear pump where the sun gear is adapted for connection to a planetary gear drive system.

The foregoing and other objects and advantages of the invention will be made more apparent as the specification proceeds.

Reference now is made to the accompanying drawings, wherein:

FIG. 5 is a fragmentary section taken in line 5—5 of FIG. 2.

When referring to corresponding members shown in the drawings and referred to in the specification, corresponding numerals are used to facilitate comparison therebetween.

Figure 1:
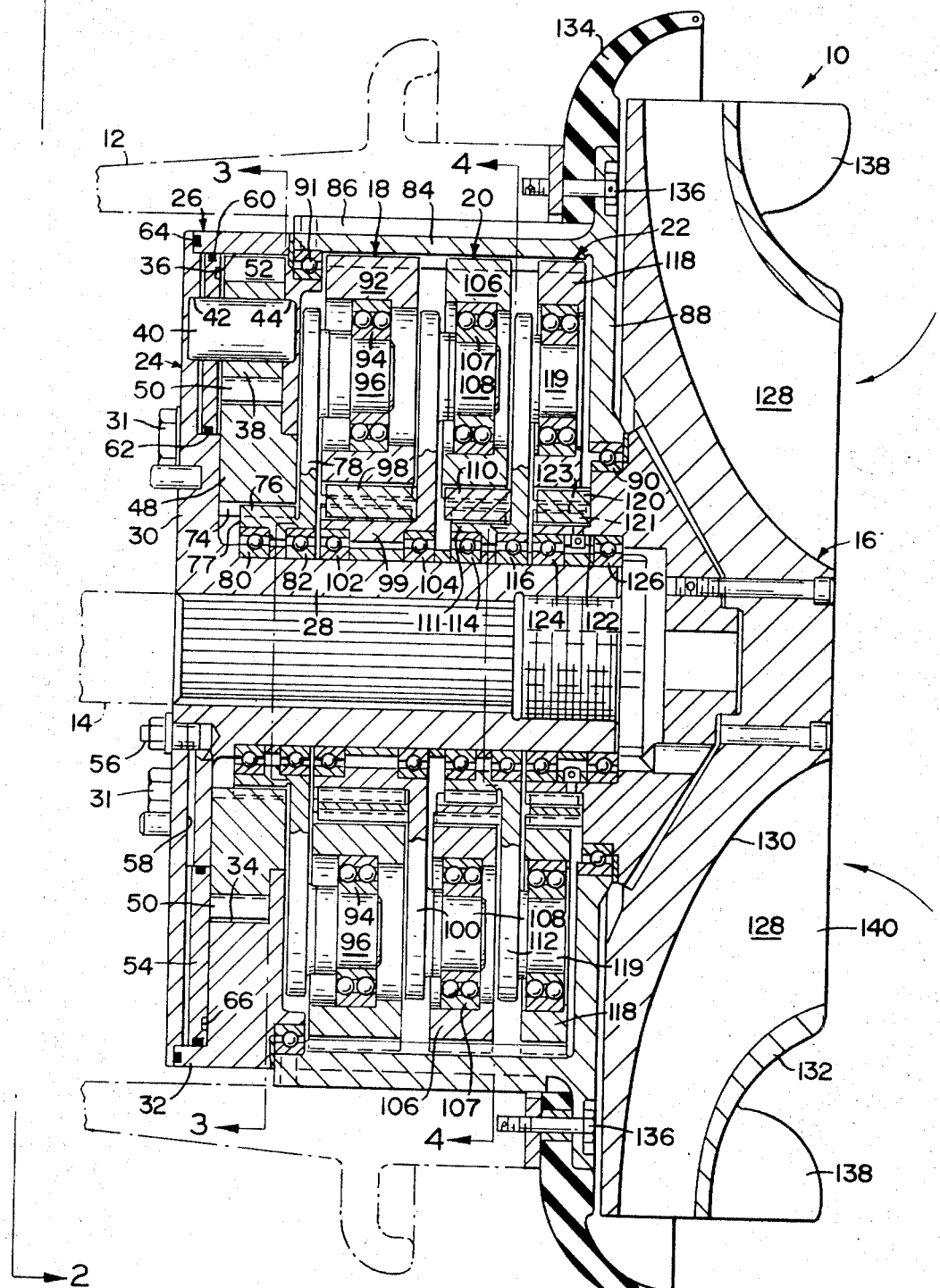
FIG. 1 is a vertical section, taken on line 1—1 of FIG. 2, through a turbo-brake and drive system therefor forming an embodiment of the principles of the invention; with a portion of a wheel being indicated in association therewith.
Figure 2:
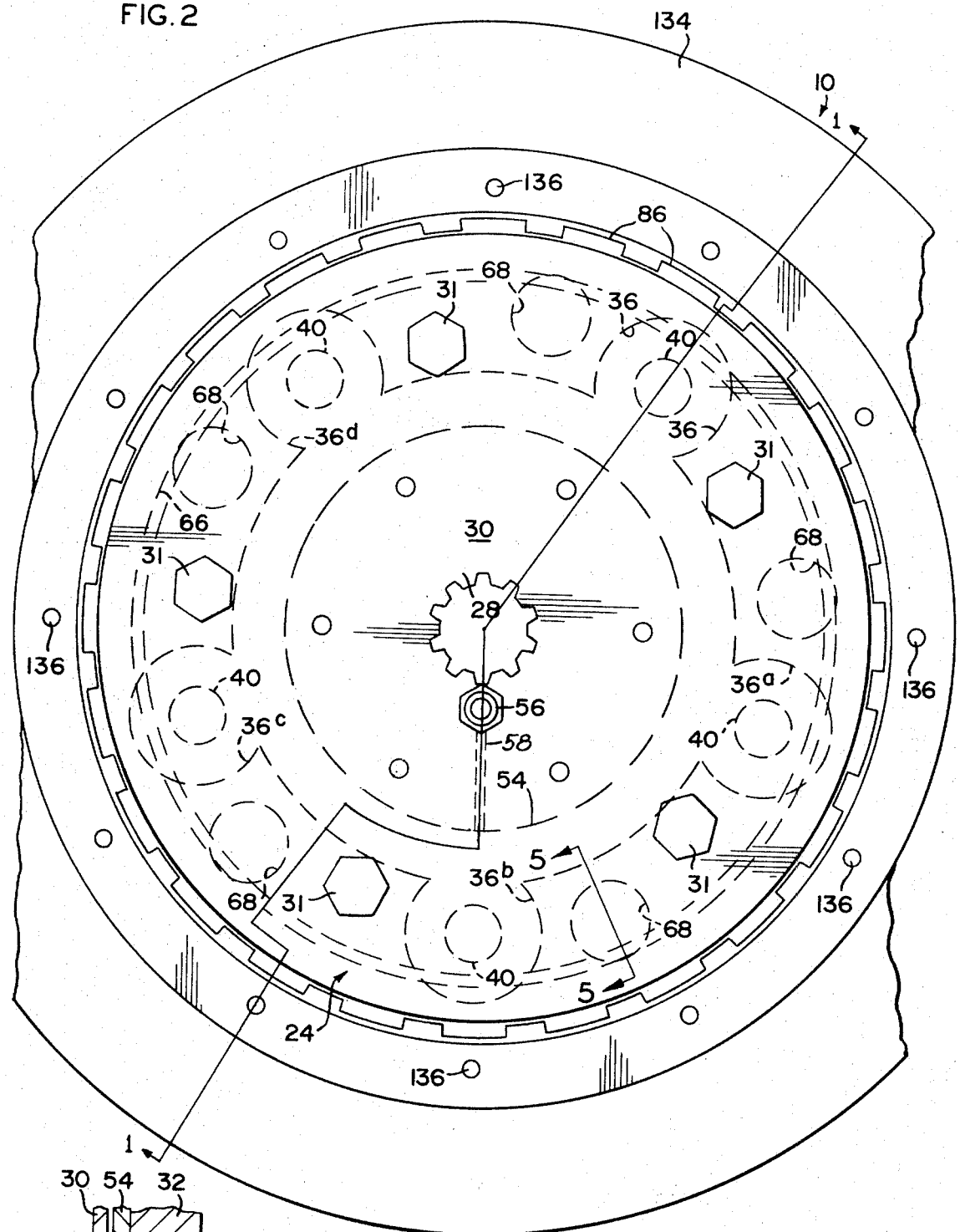
FIG. 2 is a left side elevation of the apparatus of FIG. 1.
Figure 3:
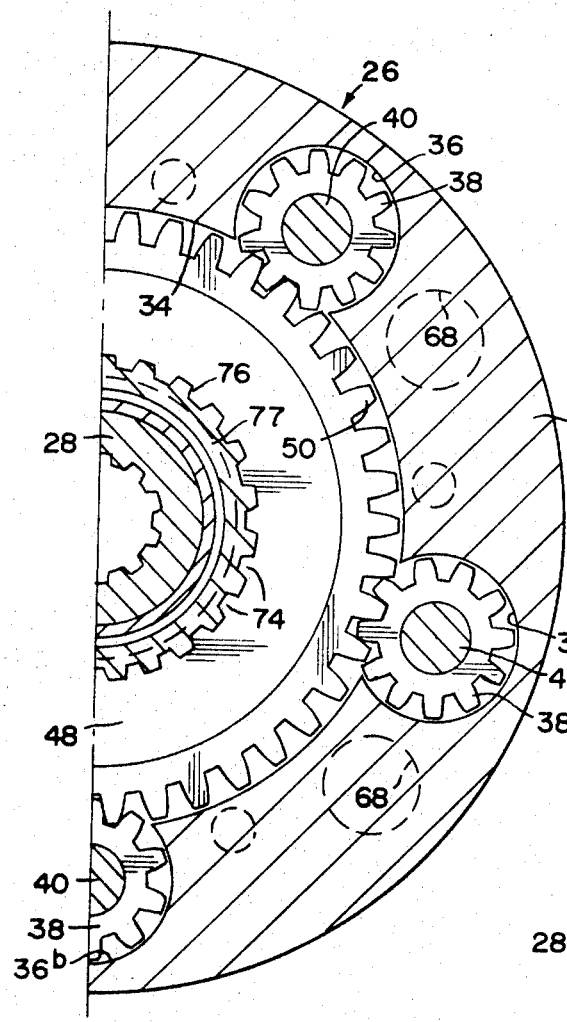
FIG. 3 is a vertical section of the apparatus of FIG. 1 taken on line 3-3 thereof.
Figure 4:
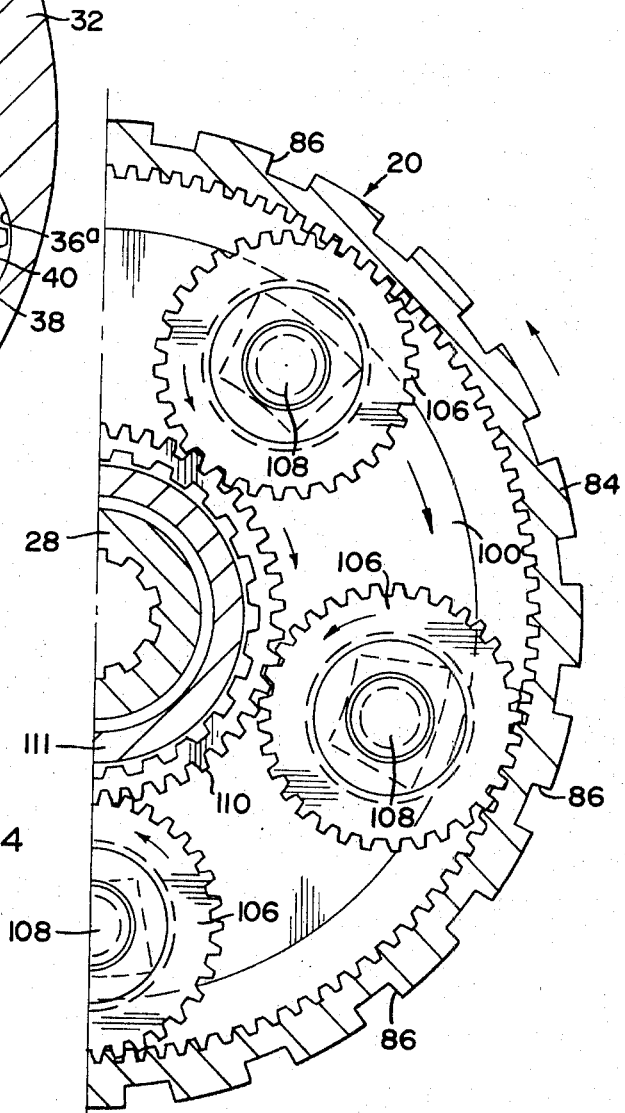
FIG. 4 is a vertical section taken on line 4—4 of FIG. 1.

With reference to the details of the structure shown in the drawings, a turbo-brake and drive means therefor is indicated as a whole by the numeral 10 and will, for convenience, be referred to hereinafter as the turbo-brake 10. This turbo-brake 10 is used in association with any conventional wheel 12 and it is designed to be carried by a known support, such as an axle or face plate 14. The turbo-brake includes an impeller 16, the details of which will be described hereinafter, which impeller 16 is rotatably associated with the axle 14 and is positioned at one end thereof, as indicated in the drawings.

The drive for the impeller 16, in this instance, comprises three inter-connected planetary gear stages indicated in general by the numerals 18, 20 and 22, respectively, for the first, second and third planetary gear stages or assemblies in the impeller drive system.

GEAR RATIO CHANGER

A gear ratio changer, indicated as a whole by the numeral 24, is provided for connection to the first stage planetary gear assembly 18 to control the input drive thereof for varying the output from the planetary gear systems transmitted to the impeller 16. This gear ratio changer 24 includes a case means, or housing indicated by the numeral 26 in which the specific gear ratio changer means are operably positioned. In this embodiment of the invention, the case means 26 includes a carrier sleeve 28 that is suitably secured to the axle 14 as being splined thereto, and which carrier sleeve 28 has an end flange or plate 30 provided at one end thereof and extending radially therefrom to form an end section of the case means 26. The case means 26 also includes a mounting plate or case 32 that has a center bore 34 formed therein and that is secured to the flange 30 by bolts 31. The case 32 also has a plurality of axially extending recesses 36, 36a, etc. of annular shape formed therein from one side thereof and extending the major portion of the axial length of the case 32, as best shown in FIG. 1 of the drawings. These recesses 36 each intersect the center bore 34 and are positioned substantially tangentially thereto in equally circumferentially spaced relation. Individual pinion gears 38 are received in each of the recesses 36 with such gears 38 being positioned on individual shafts 40 which are axially directed in the turbo-brake 10 and which shafts 40 are positioned at end portions thereof by being seated in suitable recesses 42 and 44 formed in the inner face surface of the end flanges 30 and an associated inner portion of the case 32 at each of the recesses 36, respectively. The individual pinion gears 38 are suitably journalled on the shafts 40. The sun gear 48 for the gear ratio changer means 24 is rotatably positioned within the case 32 in the center bore 34 thereof and its radially outer gear teeth 50 are meshed with the teeth of the gears 38 for relative rotation between such gears.

A closed chamber 52 is formed in the case means 26 between axially spaced, radially outer portions of the end flange 30 and adjacent portions of the case or mounting plate 32. A pressure disc, or plate 54 is received in such chamber 52 to form a partition for axial movement therein, as later described.

The case means 26 is adapted to have pressure liquid supplied thereto for controlling the position of the pressure disc 54 in the chamber 52, and these means may comprise a suitable pressure fitting 56 engaging a portion of the carrier sleeve 28 and connecting to a radially extending bore 58 formed therein and extending from a radially inner portion of the end flange 30 to the chamber 52 on the axially outer face of the pressure disc 54. This pressure disc 54 preferably has suitable packing means or sealing rings, such as the O-rings 60 and 62 shown in the drawings, to seal the pressure disc in relation to associated portions defining the chamber 52. Another conventional sealing ring 64 seals the connection between the end flange 30 and an adjacent portion of the case 32.

Any suitable pressure liquid, usually oil, is received in the chamber 52 to fill the same completely, or at least substantially completely, and a circumferentially extending liquid transmitting groove 66 is formed in the face of the pressure disc adjacent the case 32. This groove 66 extends between and connects the recesses 36 formed in the case 32 and intersects a plurality of circumferentially spaced storage chambers or bores 68 formed in the case 32 intermediate the recesses 36 in one side face of such case. Each of these cylindrical chambers 68 has a suitable resilient or flexible seal or piston 70 received therein, and having or forming an air chamber or pocket 72 on the axially inner face or surface of such piston 70. The pressure liquid received in the chamber 52 is in pressure contact with the axially outer face of these individual pistons 70 whereby as the pressure disc 54 is moved axially inwardly in the gear ratio changer means, the pressure liquid will flow into the various chambers 68 and force the pistons 70 to compress the entrapped air received within the chambers to form space to store liquid expelled from the chamber 52 by axially inward movement of the pressure disc so that the pressure disc can be brought up to form a substantially zero volume chamber on its axially inner face adjacent the gears 38 and 48.

On its radially inner periphery, the gear ratio changer sun gear 48 has a spline 74 formed thereon or secured thereto and such spline 74 is engaged with a spline 76 formed on or operably secured to a radially inner and axially offset hub portion 77 of a planetary gear carrier plate 78 for the first stage of the planetary gear drive means provided in the turbo-brake 10. This planetary gear carrier plate is journalled, as by means of bearings 80 and 82, on the carrier sleeve 28 provided in the turbo-brake assembly.

PLANETARY GEAR ASSEMBLIES AND DRIVE MEANS

The drawing shows that an elongate tubular ring gear 84 is provided in the turbo-brake and it has axially extending splines 86 provided on its outer periphery for operative engagement with corresponding splines formed on the wheel 12 whereby this ring gear 84 will be engaged with and driven by the wheel 12 to move at the same speed as the wheel. The ring gear 84 has a radially inwardly extending flange or plate section 88 provided thereon adjacent the impeller 16 and such flange 88 is in engagement with a suitable bearing 90 positioned on a hub of the impeller so that the ring gear is operably supported on the carrier sleeve 28 and bearing 91 on the gear ratio changer housing but rotatable with relation thereto.

The ring gear 84 engages a plurality of individual planetary gears 92 on the first planetary gear stage 18, which gears 92 are journalled on individual bearings 94. These bearings 94 are positioned on axially extending shafts 96 suitably secured to and protruding axially from the planetary gear carrier plate 78. The individual planetary gears 92 all are in mesh with a first stage sun gear 98, which sun gear 98 is suitably operably secured to a hub portion 99 of a second stage planetary gear carrier plate 100 by interconnecting splines like the splines 74 and 76. This hub portion of such carrier plate 100 is operably journalled on the carrier sleeve 28, as by bearings 102 and 104. In operation, this first stage sun gear 98 drives the carrier plate 100 for the second planetary gear stage assembly to cause it to precess in the opposite direction from the direction of rotation of the wheel 12.

In the second stage planetary gear assembly 20, a plurality of planetary gears 106 are provided and are journalled by bearings 107 on suitable shafts 108 suitably carried by the carrier plate 100. Such planetary gears 108 engage a second stage sun gear 110 in the same manner as the first stage of the planetary gear assembly described heretofore. This sun gear 110 is likewise operably associated with and connected to a hub portion 111 of a carrier plate 112 for the third stage 22 of the planetary gear assemblies provided to drive it in the same manner as the sun gear 98. Such carrier plate 112 is journalled on bearings 114 and 116 on the carrier sleeve 28 and serves to drive or precess such carrier plate in a direction opposite to the drive of the wheel 12. The third stage carrier plate 112 likewise has planetary gears 118 journalled on shafts 119 in circumferentially balanced relationship on such carrier plate. These gears all engage the ring gear 84 and likewise engage and drive a sun gear 120 that has a ring gear 121 formed thereon and engaging a gear 123 operably secured to of a drive hub 122 provided for the impeller 16. This drive hub 122 is positioned on the carrier sleeve, as by bearings 124 and 126, for rotation thereon.

The drive transmitted to this hub 122 is opposite to the direction of rotation of the wheel 12.

GEAR RATIO CHANGER - DRIVE ACTION

When no pressure is applied to the pressure disc 54, then the individual gear pumps formed between the pinion gears 38 and the sun gear 48 will freely rotate and oil expelled from the teeth of the sun gear as it rotates around in conjunction with the various pinion gears provided will flow around the axially outer ends of the associated gear teeth freely. The association of the first stage planetary gear carrier plate 78 with the sun gear 48 will cause such carrier plate 78 to just precess or rotate around the first stage sun gear 98 and cause no driven rotation of such sun gear 98. The sun gear 98 has the drag or frictional resistance of the second and third stages of the planetary gear systems applied thereto whereby such sun gear will not drive or rotate normally at anything more than a very minimal rate of speed unless positive forces are transmitted thereto. Thus, likewise, the sun gear 48 of the gear ratio changer will be driven at the rate of rotation of the planetary gear carrier plate 78 in relation to the axle 14 when no braking pressure is applied to the liquid in the chamber 52.

However, when the pressure disc 54 has braking pressure applied to the axially outer face thereof, it is forced to move gradually axially inwardly of the chamber 52 and decrease the space available for flow of liquid around the mating gear teeth of the pinion gears 38 and teeth of the sun gear 48. Normally only a very small clearance needs be provided for flow of the liquid in these individual gear pump means, such as about 0.020 to about 0.030 inches and hence, very small axial movement of the disc 54 will reproduce a wide variation in the relative rotational rate of the sun gear 48 in relation to the axle 14. When maximum braking pressure is exerted on the pressure disc 54, it will completely eliminate clearance in the chamber 52 or form only a very minimal liquid clearance therein. At such time, then the sun gear 48 will be held against rotation due to the pressure existing between oil or other liquid received in the teeth of the pinion gears and sun gear and with no space being provided for flow of such liquid from the teeth as they endeavor to mesh and have relative rotation therebetween. At this time, then the sun gear 48 will retain the planetary gear carrier plate 78 stationary and the engagement between the planetary gears 92 and the sun gear 98 in the first stage 18 of the planetary gear assemblies will cause such sun gear 98 and thus the carrier plate 100 for the second stage in the assembly to be driven at a higher rate of speed than the wheel which provides input drive for the planetary gears 92 by the ring gear 84. Such ring gear 84, of course, is being driven at the rate of rotation of the wheel 12 engaged therewith. Likewise, then as the sun gear 98 for the first stage of the planetary gear system is driven at a relatively high rate of speed, it will in turn drive the carrier plate 100 for the second stage planetary gear system, or cause it to precess at such high rate of speed which in turn will cause the sun gear 110 for the second stage to be driven at a higher R.P.M. speed. In turn, the sun gear 110 will drive or precess the carrier plate 112 for the third stage of the planetary gear system at the higher speed. Then the sun gear 120 and the hub 122 for the impeller will be driven at an increased multiple of speed by the engagement between the planetary gears 118 and the sun gear 120 for the third stage of the planetary gear assemblies.

It will be seen tht the impeller 16 is driven counter to the direction of rotation of the wheel 12 on the axle 14. This impeller thus can be driven at a controllable rate of speed varying from a very low rate of speed, almost 0 rpm. up to a very high rate of speed as determined by the speed changes available in the three stage planetary gear system shown in this embodiment of the invention.

However, it will be realized that one, two or more stages of planetary gears or other speed changing assemblies may be used in the drive system, as desired by being able to vary the rotational rate of the sun gear 48 gradually in the gear changer means 24 of the invention widely and ultimately to stop any rotation of such sun gear, a very high input drive ratio can be introduced into the planetary gear system to control, in proportion, the output thereof. Such gear ratio changer means is readily controlled, normally, by the pilot of an aircraft having the turbo-brake 10 of the invention thereon. Usually these turbo-brakes will be used on aircraft, but they can be used on any suitable vehicle. The braking system for the aircraft would be connected to the fitting 56 and to the associated means for transmitting braking pressure to the chamber 52. Of course, other conventional braking means usually are used in association with the turbo-brake system and would, for example, just be positioned to the left of the fragment of the wheel unit shown in FIG. 1. Thus, a combined mechanical braking action and turbo-brake action can be obtained simultaneously.

In order to complete the turbo-brake 10, the impeller 16 has a plurality of any desired types of blades 128 formed thereon and/or secured thereto intermediate axially inner and outer walls 130 and 132, respectively, of the impeller. A shield 134 preferably is secured to the ring gear 84 as by bolts 136 and such shield terminates in an outwardly flared end whereby any small stones, pebbles, etc. thrown out from the impeller 16 would be diverted to move in an axially outwardly inclined direction whereby the thrown stones, pebbles, etc. would not be forcefully impacted against an adjacent portion of the aircraft and damage thereto is avoided.

As a further feature of the invention, the impeller 16 preferably has a plurality of impeller blade extensions 138 provided thereon. These extensions may be units with the blades 128 or be separate members secured to or formed on the outer wall of the impeller, if desired. The extensions 138 aid in creating air flow adjacent the impeller to aid in obtaining a radially outward directional flow of the processed air and this avoids any air, which has been heated as it is rapidly processed in the impeller and forced to flow in a radially outward direction by the turbo-brake, from being drawn back into the mouth 140 of the impeller. Hence, cool air will flow at all times into the turbo-brake for rapid processing and compression of the air as it flows into and through the turbo-brake. Large volumes of air are processed extremely rapidly in the turbo-brake for braking action on the wheel.

It is yet a further feature of the invention that the gear changer means provided functions to produce a substantially constant pilot selected torque for braking action on the vehicle. Thus, as the wheel speed of the vehicle decreases, the vanes or blades 128 will tend to be rotated faster because of increased pressure application by the pilot whereby the turbo-brake braking torque can be maintained substantially constant with increased braking pressure application on slow down of the carrier vehicle.

In view of the foregoing, it is believed that a novel and improved gear ratio changer has been provided and which changer is particularly adapted for use in the drive system of a turbo-brake. Thus, the objects of the invention have been achieved.

What is claimed is:

1. A drive system comprising:
   a rotatable input member;
   a rotatable output member;
   a planetary gear assembly operatively connecting the input and output member; and
   a gear ratio changer comprising:
   a case having a closed chamber with hydraulic fluid therein,
   at least one driven rotatable gear mounted within the chamber,
   a rotatable driving gear intermeshing with the driven gear, said driving gear being connected to the planetary gear assembly and driven thereby,
   the hydraulic fluid in the chamber flowing around the driven gear and the driving gear as they rotate,
   means reducing the volume of the chamber and providing pressure increase therein to restrict the flow of hydraulic fluid therein and reduce the speed of rotation of the driven gear and the driving gear, and
   automatically adjustable storage means for the hydraulic fluid in the chamber operatively connecting to the chamber, said storage means comprising at least one air chamber, a seal means movably positioned in said air chamber to form a closure therefor, and means connecting the first chamber to the air chamber for flow of hydraulic fluid to the outer face of the seal means.

2. A drive system for a turbo-brake including an impeller adapted to be journalled on an axle and a planetary gear assembly including planetary gears, a planetary gear carrier plate and a sun gear operatively connected to said impeller to drive the same, and characterized by a case means adapted to be operatively carried by a axle; and
   gear ratio changer means received in said case means and connecting to said planetary gear assembly to control the same, said gear ratio changer means comprising a mounting plate forming a part of said case means and having a center bore, a sun gear operatively journalled on said axle and received in said center bore, said mounting plate having a plurality of axially directed circumferentially spaced annular recesses formed therein on one side face thereof and intersecting said center bore, a plurality of pinion gears operatively journalled in said annular recesses with peripheral portions engaging said gear ratio changer means sun gear, an annular chamber being formed between a portion of said case means and the side portion of said mounting plate having said recesses formed therein, said chamber extending radially inwardly beyond said recesses, a liquid being received in said chamber and filling the same, an annular pressure disc received in said chamber to divide it into axially inner and outer sections and axially movable therein,
   means associated with said case means for connection to a pressure system to receive pressure liquid therefrom to force said pressure disc axially towards said pinion gears to restrict hydraulic flow therefrom and control the relative rotation of said gear changer sun gear in relation to said axle, said gear ratio changer sun gear and said pinion gears forming gear pumps in said chamber with no inlet and no outlet for the pressure liquid received therein;
   said gear ratio means sun gear operably engaging said carrier plate of said planetary gear assembly to control rotation thereof in relation to said axle,
   a plurality of stages of planetary gear assemblies being provided;
   a carrier sleeve adapted to be secured to an axle and to position said planetary gear assemblies thereon; and
   said impeller being journalled on said carrier sleeve.

3. A drive system comprising:
   a rotatable input member;
   a rotatable output member;
   a plurality of planetary gear assemblies operatively connecting the input and output member, said planetary gear assemblies having carriers associated therewith; and
   a gear ratio changer comprising:
   a case having a chamber with hydraulic fluid therein, and an annular opening in the case extending between the chamber and the outside of the case,
   at least one driven rotatable gear mounted within the chamber,
   a rotatable driving gear positioned in the annular opening,
   said driving gear having a first portion extending into the chamber and having teeth intermeshing with the driven gear,
   said driving gear having a second portion extending out through the annular opening and connected to a carrier of a planetary gear assembly and driven thereby,
   the driving gear sealingly closing the annular opening in the case to retain the hydraulic fluid in the chamber,
   the hydraulic fluid in the chamber flowing around the driven gear and the driving gear as they rotate, and
   means reducing the volume of the chamber while maintaining a constant mass of hydraulic fluid therein, thereby providing pressure increase therein to restrict the flow of hydraulic fluid and reduce the speed of rotation of the driven gear and the driving gear.

4. A drive system for a turbo-brake having a plurality of planetary gear assemblies, a wheel, and an impeller all of which are rotatably carried on an axle and operatively connected to each other, and wherein the planetary gear assemblies have carriers associated therewith, the improvement comprising:
   a gear ratio chamber comprising:
   a case mounted on the axle in fixed relation thereto,
   said case having an annular chamber with hydraulic fluid therein and an annular opening through the case extending radially inwardly from the chamber and communicating with the exterior of the case,
   at least one driven rotatable gear mounted in the chamber,
   a rotatable driving gear positioned in the annular opening in sealing relationship with the case to seal the entire opening to retain hydraulic fluid in the chamber,
   the driving gear having teeth intermeshing with each driven gear in the chamber,
   the driving gear being attached to a planetary gear carrier and rotatable therewith around the axle,
   the wheel being geared to the planetary gear assembly to cause said carrier plate and driving gear to rotate, the hydraulic fluid in the chamber flowing around each driven gear and the driving gear as they rotate, and means increasing the hydraulic fluid pressure within the chamber while maintaining a constant mass of hydraulic fluid therein so as to restrict the flow of hydraulic fluid therein and reduce the speed of rotation of each driven gear and the driving gear, the reduction of speed in said driving gear causing the rotation of the wheel to be transmitted through the planetary gear assemblies to cause rotation of the impeller to dissipate the energy force of the rotating wheel and reduce the rotational speed of the wheel.

5. A drive system comprising:
a rotatable input member;
a rotatable output member;
an axle;
a plurality of planetary gear assemblies mounted on the axle and operatively connecting the input and output member, said planetary gear assemblies having carriers associated therewith; and
a gear ratio changer comprising:
a case fixedly mounted on the axle and having an annular chamber with hydraulic fluid therein, an an annular opening in the case extending between the chamber and the outside of the case,
at least one driven rotatable gear mounted within the chamber,
a rotatable driving gear positioned in the chamber and rotatable about the axle and having teeth intermeshing with the driven gear,
annular means connecting the driving gear to a carrier of a planetary gear assembly, extending out through the annular opening to cause the driving gear to be rotated by the planetary gear assemblies,
the annular connecting means sealingly closing the annular opening in the case to retain the hydraulic fluid in the chamber,
the hydraulic fluid in the chamber flowing around the driven gear and the driving gear as they rotate, and
means increasing the hydraulic fluid pressure within the chamber while maintaining a constant mass of hydraulic fluid therein so as to restrict the flow of hydraulic fluid therein and thereby reduce the speed of rotation of the driven gear and the driving gear, thereby imparting through the annular connecting means a change in rotational movement of the planetary gear assembly.

6. A drive system for a brake including brake means at least one portion of which is adapted to be journalled on an axle and a planetary gear assembly including planetary gears, a planetary gear carrier plate and a sun driving gear operatively connected to said one portion to effect the drive of the same, and characterized by a case means adapted to be operatively carried by an axle; and gear ratio changer means received in said case means and connecting to said planetary gear assembly to control the same, said gear ratio changer means comprising a mounting plate forming a part of said case means and having a center bore, said sun driving gear being operatively journalled on said axle and received in said center bore, said sun driving gear being connected to the planetary gear assembly and being driven thereby, said mounting plate having a plurality of equally spaced annular recesses formed therein on one side face thereof and intersecting said center bore, an end plate forming a part of said case operatively secured to said mounting plate and forming therewith a closed annular chamber with hydraulic fluid therein which annular chamber connects to said recesses, at least one driven rotatable gear mounted in each recess within the annular chamber, a hydraulic fluid in the annular chamber flowing around the driven gears and driving gear as they rotate, an annular disk for reducing the volume of the chamber and providing pressure increase therein to restrict the flow of hydraulic fluid therein and reduce the speed of rotation of the driven gear and the driving gear and hence the rotational speed of the planetary gear assembly while balancing the pressure on all of said driven gears, liquid storage means connecting to said annular chamber and comprising at least one air chamber, seal means movably positioned in said air chamber to form a closure therefor, and pressure supply means connecting from a brake pressure supply source through said end plate to said annular chamber for producing chamber volume reducing movement of said annular disk upon application of sufficient pressure to such disk whereby brake pressure controls the rotational speed of the said one portion of said brake means and braking energy is absorbed almost completely by said brake means.

7. A drive system comprising:
a rotatable input member;
a rotatable output member;
a planetary gear assembly operatively connecting the input and output members; and
a gear ratio changer comprising:
a case,
an end plate operatively secured to said case and forming therewith a closed chamber with hydraulic fluid therein,
at least one driven rotatable gear mounted by a shaft within the chamber, said shaft being journalled by end portions positioned on said end plate and on said case,
a rotatable driving gear intermeshing with the driven gear, said driving gear being connected to the planetary gear assembly and driven thereby,
the hydraulic fluid in the chamber flowing around the driven gear and the driving gear as they rotate,
means slidably positioned in the chamber for reducing the volume of the chamber and providing pressure increase therein to restrict the flow of hydraulic fluid therein and reduce the speed of rotation of the driven gear and the driving gear,
pressure supply means connecting through said end plate to said chamber for producing chamber volume reducing movement of said lastnamed means upon application of sufficient pressure to one face thereof, and
automatically adjustable storage means for the hydraulic fluid in the chamber and a groove in one face of said last-named means operatively connecting the chamber to the storage means.

8. In a drive system as in claim 7 the provision of a plurality of circumferentially spaced driven rotatable gears positioned in individual recesses formed in said case, said last-named means comprising an annular disc, said groove in said means being annular and connecting all of said chambers to said storage means.

9. In a drive system as in claim 8 where said storage means comprise at least one air chamber, and a seal means movably positioned in said air chamber to form a closure therefor, said groove connecting to the air chamber for flow of hydraulic fluid to the outer face of the seal means.

10. In combination with an axle and a wheel journalled on said axle, a turbo-brake including an impeller journalled on said axle adjacent an end thereof to draw air in from adjacent said axle and perform work thereon, an output sun gear journalled on said axle and secured to said impeller to drive the same, a tubular ring gear journalled on said axle and engaging said wheel to be driven thereby a plurality of stages of planetary gear assemblies, planetary gears and carrier plates therefor and sun gears operatively connected to each other and to said impeller to drive the same and characterized by a carrier sleeve secured to said axle to position said sun gears and planetary gear carrier plates thereon and having an end flange thereon;

and gear ratio changer means connecting to the first stage of said planetary gear means to control the drive of the same, said gear changer means comprising a mounting plate having a center bore, a sun gear journalled on said carrier sleeve, which sun gear is receive in said center bore, said plate having a plurality of axially directed circumferentially spaced annular recesses formed therein on one side face thereof and intersecting said center bore, means securing said mounting plate to said end flange, a plurality of pinion gears operatively journalled in said annular recesses with peripheral portions engaging said gear ratio changer means sun gear, a closed annular chamber being formed between said end flange and the side portion of said mounting plate having said recesses formed therein, said chamber extending radially inwardly beyond said recesses, a liquid being received in said chamber and at least substantially filling the same, an annular brake disc received in said chamber and axially movable therein, and said end flange having a fluid conducting bore formed therein for connection to a brake system to receive pressure liquid therefrom to force said brake disc axially towards said pinion gears to restrict hydraulic flow therefrom and control the relative rotation of said first gear changer sun gear in relation to said axle, said gear changer sun gear and said pinions forming gear pumps in said chamber with no inlet and no outlet for the pressure liquid received therein; and said ring gear engaging said planetary gears of each of said stages.

11. A combination as in claim 10 where expansion chamber means connect to said first chamber to receive liquid therefrom to store it therein when said brake disc is moved axially inwardly, and gear means connecting said gear changer means sun gear to said carrier plate of said first stage of said planetary gear assemblies to control rotation thereof in relation to said wheel by control of the rotation of such sun gear as driven by such carrier plate.

12. A combination as in claim 10 where said impeller has axially spaced inner and outer walls, a plurality of impeller blades positioned between said walls, an input opening for said impeller being formed at the radially inner end of said outer wall, and impeller blade means carried by said impeller, at circumferentially spaced locations on the radially outer end of said outer wall.

* * * * *